(12) United States Patent
Johnson et al.

(10) Patent No.: US 7,269,734 B1
(45) Date of Patent: Sep. 11, 2007

(54) INVISIBLE DIGITAL WATERMARKS

(75) Inventors: Andrew Johnson, Surrey Hills (AU); Michael Biggar, Research (AU)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 09/367,797

(22) PCT Filed: Feb. 20, 1998

(86) PCT No.: PCT/AU98/00106

§ 371 (c)(1),
(2), (4) Date: Jan. 19, 2000

(87) PCT Pub. No.: WO98/37513

PCT Pub. Date: Aug. 27, 1998

(30) Foreign Application Priority Data

Feb. 20, 1997 (AU) .................. PO5218/97

(51) Int. Cl.
*H04L 9/00* (2006.01)
(52) U.S. Cl. .............. 713/176; 382/100; 382/232
(58) Field of Classification Search .......... 382/100, 382/232, 280–281; 713/176, 168–181; 380/54
See application file for complete search history.

(56) References Cited

U.S. PATENT DOCUMENTS

| | | | |
|---|---|---|---|
| 3,984,624 A | 10/1976 | Waggener | |
| 4,313,197 A | 1/1982 | Maxemchuk | |
| 4,389,671 A | 6/1983 | Posner et al. | |
| 4,675,746 A | 6/1987 | Tetrick et al. | |
| 4,750,173 A | 6/1988 | Bluthgen | |
| 4,939,515 A | 7/1990 | Adelson | |
| 5,113,437 A | 5/1992 | Best et al. | |
| 5,146,457 A | 9/1992 | Veldhuis et al. | |
| 5,319,735 A | 6/1994 | Preuss et al. | |
| 5,321,748 A | 6/1994 | Zeidler et al. | |
| 5,327,237 A | 7/1994 | Gerdes et al. | |
| 5,555,305 A | 9/1996 | Robinson et al. | |
| 5,581,800 A | 12/1996 | Fardeau et al. | |
| 5,652,626 A | 7/1997 | Kawakami et al. | |
| 5,659,726 A | 8/1997 | Sandford, II et al. | |
| 5,721,788 A * | 2/1998 | Powell et al. ............... | 382/100 |
| 5,727,092 A | 3/1998 | Sandford, II et al. | |
| 5,774,452 A | 6/1998 | Wolosewicz | |
| 5,809,139 A | 9/1998 | Girod et al. | |
| 5,822,436 A * | 10/1998 | Rhoads ........................ | 380/54 |
| 5,857,038 A | 1/1999 | Owada et al. | |
| 5,859,920 A | 1/1999 | Daly et al. | |
| 5,901,178 A | 5/1999 | Lee et al. | |
| 5,903,648 A * | 5/1999 | Javidi ........................ | 380/54 |
| 5,905,800 A | 5/1999 | Moskowitz et al. | |

(Continued)

OTHER PUBLICATIONS

Cox et al, A Secure Imperceptable yet perceptually salient, spread spectrum watermark for Multimedia, IEEE, 192-197.*

(Continued)

*Primary Examiner*—Kim Vu
*Assistant Examiner*—Paula Klimach (57) ABSTRACT

A digital watermark is added to audio or visual content. An illustrative embodiment segments the content, permutes the segments, and transforms such data into another domain. The transformed data is altered slightly to encode a watermark. The altered data can then be inverse-transformed, and inverse-permuted, to return same to substantially its original form. Related watermark decoding methods are also detailed, as are ancillary features and techniques.

52 Claims, 4 Drawing Sheets

U.S. PATENT DOCUMENTS

| | | | |
|---|---|---|---|
| 5,915,027 A * | 6/1999 | Cox et al. ..................... 380/54 |
| 5,919,730 A | 7/1999 | Gasper et al. |
| 5,930,369 A * | 7/1999 | Cox et al. ..................... 380/54 |
| 5,943,422 A | 8/1999 | Van Wie et al. |
| 6,031,914 A * | 2/2000 | Tewfik et al. ................ 380/54 |
| 6,122,403 A | 9/2000 | Rhoads |
| 6,185,312 B1 * | 2/2001 | Nakamura et al. .......... 382/100 |
| 6,201,879 B1 | 3/2001 | Bender et al. |
| 6,208,735 B1 | 3/2001 | Cox et al. |
| 6,272,634 B1 * | 8/2001 | Tewfik et al. ............... 713/176 |
| 6,504,941 B2 * | 1/2003 | Wong ......................... 382/100 |
| 2002/0054356 A1 | 5/2002 | Kurita et al. |

OTHER PUBLICATIONS

Boland et al, Watermarking Digital Images for Copyright Protection, Fifth International Conference on Image Processing and its Applications, Conf. Publ. No. 410, pp. 326-330, 1995.

Bors et al, Image Watermarking Using DCT Domain Constraints, Proc. IEEE Int. Conf. On Image Processing, vol. 3, pp. 231-234, 1996.

Bruckstein et al, A Holographic Transform Domain Image Watermarking Method, Circuits, Systems and Signal Processing, vol. 17, No. 3, pp. 361-389, 1998 (includes Bell Labs "Internal Memo" of Sep. 1994 as appendix).

Burgett et al, A Novel Method for Copyright Labeling Digitized Image Data, 12 pages, 1994.

Cox et al, A Secure, Imperceptible Yet Perceptually Salient, Spread Spectrum Watermark for Multimedia, IEEE, Southcon/96, Conference Record, pp. 192-197, 1996.

Cox et al, A Secure, Robust Watermark for Multimedia, Proc. Of First Int'l Workshop on Information Hiding, pp. 185-206, 1996.

Cox et al, Secure Spread Spectrum Watermarking for Images, Audio and Video, Proc. IEEE Int. Conf. On Image Processing, vol. 3, pp. 243-246, 1996.

Hsu et al, Hidden Signatures in Images, Proc. IEEE Int. Conf. On Image Processing, vol. 3, pp. 223-226, 1996.

JPEG Group's JPEG Software (release 4), FTP.CSUA.Berekeley. Edu./Pub/Cypherpunks/Applications/JSTEG/JPEG.Annoucement. GZ, 2 pages, 1993.

Koch et al, Copyright Protection for Multimedia Data, Proc. Of the Int. Conf. On Digital Media and Electronic Publishing, Leeds, U.K., 15 pages, 1994.

Nakamara et al, A Unified Coding Method of Image and Text data using Discrete Micropatterns, Electronics and Communications in Japan, Part 1, vol. 72, No. 4., pp. 50-56, 1989.

Tanaka et al, A Visual Retrieval System With Private Information for Image Database, Proceeding Int. Conf. On DSP Applications and Technology, pp. 415-421, 1991.

U.S. Appl. No. 60/024,979, filed Aug. 30, 1996, Tewfik et al.

Caronni, "Assuring Ownership Rights for Digital Images," Proceedings of Reliable IT Systems/VIS '95, 1995 (originally "Ermitteln Unauthorisiertcr. Vcrtciler von Maschinenlesbaren Daten," ETH (Zurich) Technical Report, Aug. 1993).

Dautzenberg, "Watermarking Images," Trinity College (Dublin) Dept. of Microelectronics and Electrical Engineering (47 pages), Oct. 1994.

Szepanski, "A Signal Theoretic Method for Creating Forgery-Proof Documents for Automatic Verification," Proceedings 1979 Carnahan Conference on Crime Countermeasures, May 16, 1979, pp. 101-109.

Langelaar et al, "Real-Time Labeling Methods for MPEG Compressed Video," Proc. 18$^{th}$ Symp. on Information Theory in the Benelux, May 1997, pp. 25-32.

Langelaar et al, "Robust Labeling Methods for Copy Protection of Images," Proc. Storage and Retrieval for Image and Video Databases V, Feb. 13-14, 1997, San Jose, CA.

U.S. Appl. No. 60/024,979 to Tewfik et al, filed Aug. 30, 1996.

* cited by examiner

INVISIBLE DIGITAL WATERMARKS

This invention relates to the provision of identification or authentication data, sometimes referred to as a watermark or signature, in digital media data such as digital image or audio data. In particular, the present invention relates to a method and apparatus for incorporating a watermark in digital media data, and a method and apparatus for retrieving or extracting a watermark from digital media data in which a watermark has been previously incorporated.

In this specification the term "watermark" is used to refer to any distinctive or distinguishing data which may be used for identification or authentication of the digital media data associated therewith, or of some attribute of the media data such as the source thereof. A watermark may comprise image data, such as pixel data forming a logo or the like, or may be in the form of coded text and/or binary numbers, for example, which represent a message. In some applications the watermark data may include error correction coding techniques to improve the robustness of the watermark to image manipulation. The format of the signal that is to be watermarked is not restricted to a multi dimensional representation. It is also possible for audio information to be watermarked. This method of encoding data is not restricted to information associated with copyright and could be used to convey any suitable information in a hidden manner.

Watermarks are utilised in media data for a number of reasons, one being to prevent or discourage copying of the media data if it is subject to copyright, or to at least allow for identification of the media data even if it is copied. Visible watermarks have been employed for many years in varying applications including banknotes and photographs, but have significant disadvantages because of their visible nature. Although a visible watermark may be quite effective in discouraging copying of an associated image, in general it is considered disadvantageous for a watermark to be obtrusive upon the original image.

Besides the issue of whether or not the watermark is visible in an associated image (or audible in the case of watermarked audio media), several other factors are also considered important. For one, the watermark should be robust to manipulation of the watermarked media, and should be secure so as to not be easily removable by a malicious user. Before the advent of digital media processing and manipulation, a degree of robustness and security was inherent in a visible watermark, because a copy of the watermarked image would generally bring with it the visible watermark itself which would be difficult to remove. However, digital processing makes it possible to perform many sophisticated manipulative operations on watermarked media, which may degrade the visible watermark or be utilised to alter an image to at least substantially remove the watermark. In this case, therefore, the properties of a visible watermark count against the security thereof since it is clearly visible what must be removed or altered in the watermarked image. A paper entitled "Protecting publicly-available images with a visible image watermark" (Gordon Braudaway, Karen Magerlein & Fred Mintzer; SPIE Vol. 2659, pp 126-133) discusses robustness and security in visible image watermarks.

Visible watermarks are considered unsuitable for many modern applications because of the intrusive effect of the watermark on the original media. Watermarking schemes have been developed in which the watermark is substantially invisible on an original image but readily visible on a copy thereof. However, such schemes generally rely upon characteristics of photocopying or electronic scanning apparatus, and so are only suitable for a limited range of applications, such as in images or text on paper documents. In any event, these watermarking schemes are also subject to security difficulties arising from digital processing and manipulation.

In media involving a sequence of images, such as video media, it is particularly undesirable for a watermark to be intrusively visible, since considerable effort is expended in providing the image data to the user in a form which is as visually clear as possible, and a visible watermark may significantly detract from the original image. Visible watermarks are presently used in some video applications, particularly television coverage of live sporting events where a relatively small and faint logo or the like is superimposed on the television picture, typically near one corner thereof. This is not completely satisfactory, besides the visual intrusion, because the logo can be easily cropped from the picture in a copy thereof, or could be relatively easily removed, at least substantially, with digital processing techniques. To make the visible watermark more secure it should be placed over the visually most important part of the image, which also makes the watermark more intrusive and thus less desirable.

Invisible watermarking techniques, particularly for digital media data, have been developed, and one is described in an article entitled "Watermarking Digital Images for Copyright Protection" (J. J. K. O'Ruanaidh, F. M. Boland & O. Sinnen). This article discloses a method of embedding a watermark in a digital image which is said to be invisible and quite robust. The image data is divided into rectangular blocks, and each block is then transformed using either a Walsh transform, discrete cosine transform (DCT) or wavelet transform. The bits defining the watermark graphic are inserted in the digital image by incrementing or decrementing a selected coefficient in the transform domain of the data block. Coefficients are selected according to a criterion based on energy content. Another algorithm described in the article relates to insertion of watermark data based on the use of the discrete Fourier transform (DFT). This method differs fundamentally from the transform domain technique outlined above. The DFT is a complex transform that generates complex transform domain coefficients given a real valued input. The watermark is placed in the phase component of generated transform coefficients when using this transform.

Another article which addresses the difficult issues of digital watermarking is "Secure Spread Spectrum Watermarking for Multimedia" (Ingemar J Cox, Joe Kilian, Tom Leighton & Talal Shamoon; NEC Research Institute, Technical Report 95-10). This article describes an invisible digital watermarking method for use in audio, image, video and multimedia data. The method described in this article also involves a frequency domain transform of the image data and insertion of the watermark data whilst in the transform domain. In practice, in order to place a length n watermark into an N×N image, the discrete cosine transform of the image is computed, and the watermark data encoded into the n highest magnitude coefficients of the transform matrix, excluding the dc component. In other words, the watermark data is placed in transform domain components of greatest perceptual significance, which enables the watermark to be robust to image distortion and unauthorised removal without serious degradation of the image itself. This watermarking algorithm employs an energy compacting transform, which makes the selection of transform coefficients for encoding of the watermark data very important. For most images the coefficients selected will be the ones corresponding to the low spatial frequencies, with the result that significant tampering of the image at those frequencies would destroy the image fidelity before the encoded watermark. The watermarking techniques of J. J. K O'Ruanaidh et al and Ingemar J. Cox et al require the original image when performing the watermark extraction operation. As a consequence, proof of ownership is accomplished only if the original image is certified as being the original by a trusted third party, and the particular segment of the original image must be first identified and found before ownership is verified.

The technology detailed herein addresses some of the difficulties identified in the prior art.

As detailed more fully below, an exemplary method for inserting data into digital media data may include:

segmenting the digital media data into data blocks;

applying a pseudo-random reversible function to a block of the digital media data to obtain a modified data block;

applying an orthogonal transform on the modified data block to obtain transform domain data;

modifying at least one selected transform domain data coefficient in accordance with identification or authentication data;

inverse transforming the transform domain data having the at least one modified coefficient; and     applying an inverse pseudo-random function to obtain watermarked digital media data.

The pseudo-random reversible function preferably has the property of flattening the power spectral density of the data block (i.e., the function performs a spectral whitening operation), such that each coefficient then generated by the transform contributes substantially equally to the total energy of the block. This allows the watermarking process to be less sensitive, with regard to introduced distortion, to the selection of the transform coefficient which is modified in the watermark insertion operation.

As detailed more fully below, an exemplary method for extracting data from watermarked digital media may include:

segmenting the digital media data into data blocks;

applying a pseudo-random reversible function to a block of the digital media data to obtain a modified data block;

applying an orthogonal transform to the modified data block to obtain transform domain data; and     extracting identification or authentication data from at least one coefficient of the transform domain data.

The insertion and/or extraction method can be performed in real time, which is particularly advantageous when the digital media data has presentation timing restrictions, such as in the case of real time video and/or audio data.

It is preferred for optimal performance that the average (dc) component of the transformed media data be restricted to a single known transform coefficient and that this transform coefficient is not available for modification by the watermark insertion operation. It is also preferred that the pseudo-random reversible function be tolerant to the introduction of noise resulting from signal processing that could subsequently be performed on the watermarked media data. Many different pseudo-random functions could be used for this application. One pseudo-random function that offers good performance in terms of its noise rejection capability, spectral flattening performance and simplicity of implementation is a permutation of the data block based upon a keyed random number generator. In that case, the user should ensure that a permutation is selected that exhibits the desired spectral whitening characteristics as this is not guaranteed by all permutations.

A number of different transforms exist that could be used as the orthogonal transform operation in the preferred method. These include the Walsh Hadamard Transform (WHT), Discrete Cosine Transform (DCT), Discrete Sine Transform (DST) and Fast Fourier Transform (FFT). The Walsh Hadamard Transform is the preferred choice due in part to its low implementation complexity. The AC transform coefficients generated with such a transform in conjunction with an appropriate pseudo-random function, using real image data as input, are characterised by all possessing approximately equal energy. The selection of transform coefficient(s) for modification can thus be based on a random keyed operation to further enhance the security of the watermark.

For functions and transforms that do not restrict the average value of the data block to a single transform coefficient, it is preferred (to minimise watermark visibility) that the average (dc) value for the data block is calculated, stored, and subtracted from each data value in the data block prior to the application of the of the pseudo-random function. The average value is subsequently retrieved and added to each data value making up the watermarked data block immediately after the application of the inverse pseudo-random function.

The application of the pseudo-random function and the application of the orthogonal transform can be combined into a single operation. Similarly with respect to the inverse pseudo-random function and inverse transform. A combined data permutation and transform operation can be considered equivalent to, in the one dimensional case, performing a permutation upon the columns making up the basis matrix of the transform in question. Each permutation will yield an orthogonal transform, hence the number of transforms contained in the set is equal to the number of available permutations. Using this interpretation, the security of the watermark relies not just on which transform coefficient has been modified to contain the watermark data, but also on which member of the set of available transforms has been used.

In practice, the segmenting of the digital media data into data blocks might comprise forming blocks of 64×64 pixels of image luminance pixel data, where the watermark is to be inserted into a still image or image sequence. The block size need not be restricted to being square and of dimension 64×64 pixels, both smaller and larger block sizes are possible depending upon application requirements. In practice, the identification/authentication data which is inserted into a data block of digital media data might comprise a pixel from a binary graphic, or data in the form of bits used to represent text and binary numbers, for example. The watermark data is inserted into the data block that has undergone a block transform operation. The distortion introduced due to the insertion of watermark data is dependent upon the block size, the number of transform coefficients modified by the insertion operation and the magnitude of the modification. The watermark data density per block is arbitrary depending upon application requirements. In general, however, the higher the density the more visually noticeable is the inserted watermark in the image. A series of data blocks may be contained in a single image frame or spread over a number of image frames.

A great variety of other arrangements and improvements are also detailed.

Certain embodiments detailed below have one or more of the following advantages:

1. the presence of the watermark is invisible (i.e., the watermarked visual or audio material is visually or auditorially substantially indistinguishable from the original);
2. the watermark is robust to signal manipulation and distortion.
3. the watermark is secure;
4. the original media data is not required in order to extract the watermark;
5. the watermark can be inserted and/or extracted by a simple computational procedure which can be done in real time.

The foregoing, and additional features and advantages of our technology will be more readily apparent—by way of example only—from the following detailed description, which proceeds with reference to the accompanying drawings.

DETAILED DESCRIPTION

The technology detailed herein relates to the insertion and extraction of identification or authentication data for use as a watermark in digital media data, such as digital image data, still or sequential, digital audio data or the like. A watermark provided in digital media data may provide a means for identification of the source or some other attribute of the media data as may be required to prove copyright ownership, for example. As mentioned above, embodiments detailed herein may have a number of advantageous properties, including:

the watermark presence being at least substantially invisible (ie the watermarked visual or audio material is visually or auditorially substantially indistinguishable from the original);

the watermark can be inserted and/or extracted by a simple computational procedure which can be done in real time for audio and/or video media data; and the original media data not being required in order to extract the watermark from the watermarked media data.

Additionally, as also discussed above, it is desirable for watermarks in digital media data to also be both secure in that a malicious user cannot easily remove or disguise the watermark so as to prevent extraction, and robust to enable the inserted watermark to survive manipulation of the watermarked media data. Digital images and image sequences, for example, are seldom stored or transported over a communications link in their raw format. Frequently some form of compression may be applied to the media data, and it is therefore important that the signal processing associated with the compression algorithm does not remove or wash out the associated watermark inserted in the media data.

Although the following description of embodiments of the present invention refer primarily to still or sequential image data, it is to be understood that the invention is equally applicable to other forms of digital media data, such as digitised audio data.

In an embodiment of the invention, image pixel data is subdivided into 64×64 pixel spatial domain blocks in order to provide a manageable data segment in which to insert watermark data. For example, a digital image comprising 1,024×768 pixels may be nominally divided into blocks of 64×64 pixels so that the entire image is contained in an array of 16×12 image data blocks (a total of 192 data blocks). Different watermark data may then be inserted into each data block, so that the watermark data is spread over the entire image. For example, the watermark might comprise a 16×12 pixel logo or the like, so that a value representing each pixel of the logo is inserted in a respective data block of the digital image. Alternatively, the watermark may comprise a text message formed in ASCII code and/or binary numbers. A message comprising of 192 bits could be inserted in the digital image if a watermark density of $1/4096$ (one bit per 64×64 block) was employed.

The invisibility and robustness of the watermark are aided by dividing the image into blocks and distributing the watermark data throughout the data blocks, and are further facilitated by the insertion procedure utilised to insert the watermark data into each data block. The following steps are used to insert a watermark data bit or binary pixel graphic into a 64×64 spatial domain luminance data block.

(i) Permute the 64×64 data block using a predetermined random permutation. There exist 4096 factorial different ways in which this permutation can be performed. To minimise the distortion introduced by the watermark modification, a permutation should be selected that performs a spectral whitening operation on a signal that has a predominant low pass power spectral density. The permutation is generated from a keyed pseudo-random operation.

(ii) Transform the permuted data using a Walsh Hadamard Transform. This transform can be implemented as a 4096-point one dimensional fast transform operation.

(iii) Watermark data is inserted into the data block by modification of selected transform coefficient(s). The coefficient selection process is based on a keyed-pseudo random operation, and does not include the dc coefficient in set of coefficients available for modification. To maximise security of the watermarking process, different coefficients are selected via the pseudo-random operation for each data block.

A watermark data bit can be represented by the sign of a selected transform coefficient. A transform coefficient value greater than or equal to zero could represent logic zero and the negative values logic one. Transform coefficient(s) need only be modified if necessary, to ensure that the sign (+/−) corresponds the digital bit to be embedded (1/0).

(iv) An inverse transform is then applied to reconstruct an approximation of the original 64×64 spatial domain data block. In the transform domain, the watermark data is completely contained by one transform coefficient when using a watermark data density $1/4096$. In the spatial domain, however, the watermark data is distributed over each of the pixels making up the 64×64 data block.

The watermark read operation is accomplished by repeating steps (i) and (ii) above. The original image or image sequence is not required for the reading operation. The watermark data can be extracted with the knowledge of the permutation applied to the data block, the transform operation, and which of the transform coefficient(s) modified to contain the watermark data. The permutation employed is preferably kept secret by the owner of the image or image sequence. The permutation could be represented by a secret seed number to a well defined pseudo random number generator.

Block transforms such as the classic Walsh Hadamard Transform (WHT), Discrete Cosine Transform (DCT), Discrete Sine Transform (DST) and the Haar Transform (HT) can be employed in the watermarking process in embodiments of the invention. For transforms that isolate the average block value or dc value into one coefficient, that coefficient should not be used to contain watermark data. The WHT is the preferred choice for the transform operation due to its low implementation complexity. Fast transform implementations of the WHT exist that require only summing and one scaling operation, and the transform basis vector contains only +1 and −1 elements. The analysis and synthesis transforms are identical.

Figure 1:
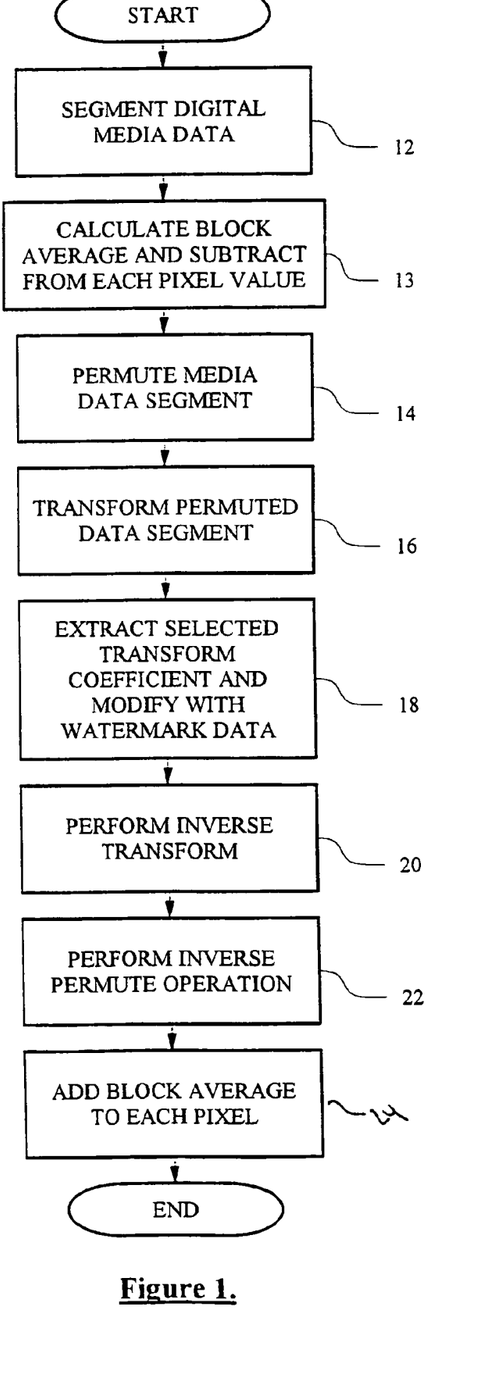
FIG. 1 is a flowchart illustrating operations for inserting watermark data into digital media data.

FIG. 1 illustrates a flow chart of operation involved in insertion of watermark data into digital media data, according to an embodiment of the invention. Beginning at step 12, the digital media data is first segmented into manageable data blocks such as blocks of 64×64 pixels or equivalent data elements. Step 13 calculates the average pixel value for the block which is then subtracted from each pixel. Step 13 is unnecessary when using a transform that contains the block average in a single transform coefficient. This is the case with the WHT and the DCT, for example. The resulting dc transform coefficient should not, however, be used to contain watermark data. The media data block or segment is then subjected to a permute operation (step 14) in which the data elements of the block or segment are rearranged in a pseudo random, but repeatable and reversible manner. Next, at step 16, the permuted spatial domain media data segment is subjected to the transform operation. In this embodiment one of the transform coefficients is selected and modified to include watermark data. When watermarking images or image sequences a watermark data bit could be represented by the sign of the selected transform coefficient. A transform coefficient value greater than or equal to zero could represent logic zero and the negative values logic one.

The watermark data density per block in this case is 1/4096. In some applications, densities greater than 1/4096 may be required.

Following insertion of the watermark data into the transform domain of the media data, the spatial domain media data is then reconstructed through steps 20, 22 and 23 by performing an inverse transformation followed by an inverse permute operation and then the previously subtracted block average value added to each pixel making up the block. Again, step 23 is not necessary when using a transform that contains the block average in a single transform coefficient. The resulting digital media data segment contains watermark data which is robust to manipulation thereof, secure from unauthorised removal, and yet the reconstructed, watermarked media data is substantially indistinguishable from the original spatial domain media data when compared in subjective quality testing.

Figure 2:
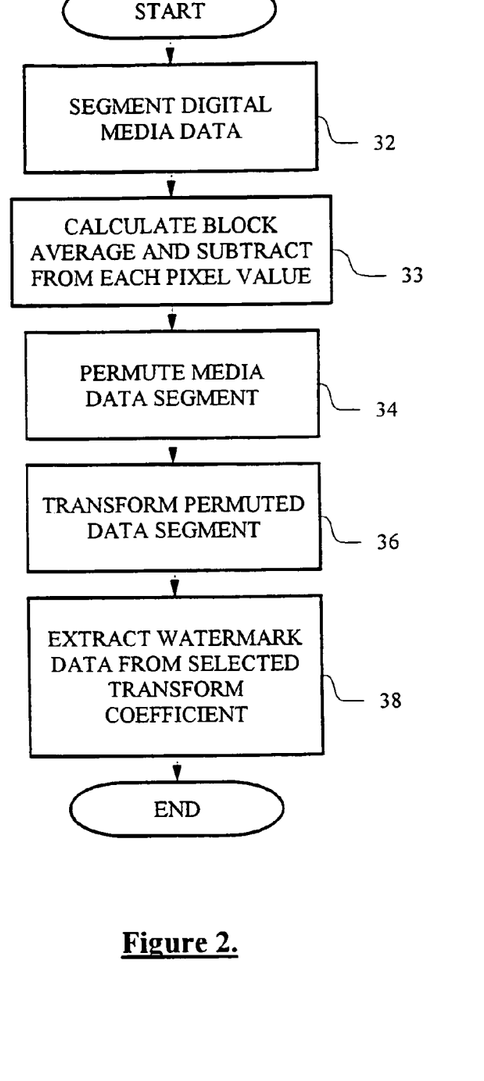
FIG. 2 is a flowchart illustrating operations for extracting watermark data from digital media data.

In order to extract the watermark data form digital media data in which watermark data has been previously inserted, the procedure outlined in the flow chart of FIG. 2 may be employed. Essentially this involves steps mirroring the first half of the procedure illustrated in FIG. 1. The digital media data is first segmented as discussed previously (step 32), the average pixel value for that block is determined and subtracted from each pixel (step 33) if necessary. The resulting data block is then subjected to a permute operation as shown at step 34. The permute operation must be the same as that performed during insertion of the watermark data, and thus if different permute operations are variously employed, some record must be maintained of which of the particular 4096 factorial permutations applies to the particular media data segment in question. This could be in the form of a secret seed to a well defined pseudo random number generator. The permuted media data segment is then transformed with the same transform used by the insertion operation (step 36). Then it is a simple matter to extract the particular coefficient for the transform domain media data and then recover from this the watermark information.

Figure 3:
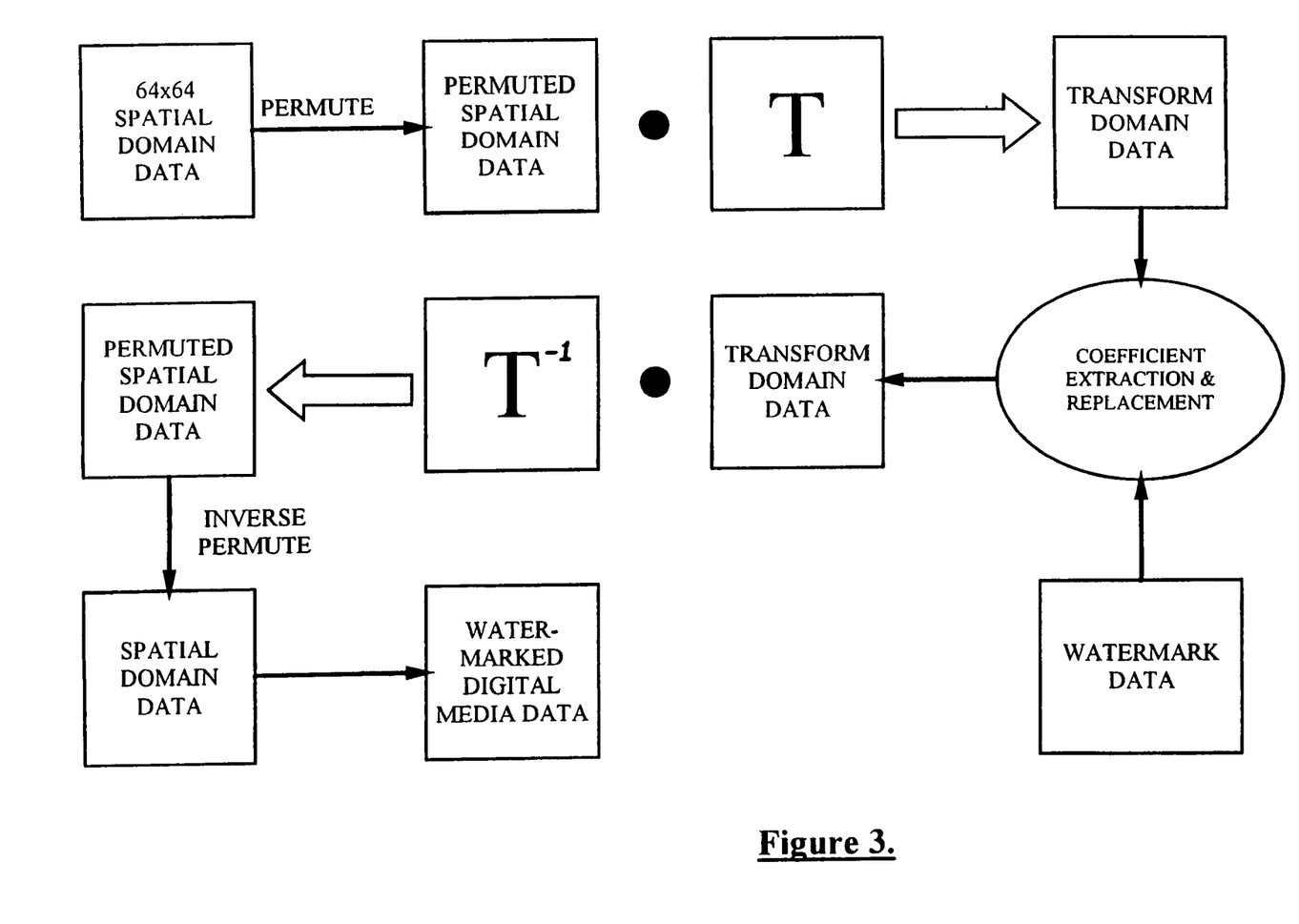
FIG. 3 is a diagram of the watermark insertion process of a preferred embodiment of the present invention.

FIG. 3 illustrates a block diagram of the watermark insertion process described in connection with the flow chart of FIG. 1. As discussed above, in this embodiment only a single watermark data component, eg a data bit or binary graphic pixel, is inserted into each selected digital media data segment or block, and the information required to reconstruct an entire watermark requires the examination of a number of digital media data segments.

Figure 4:
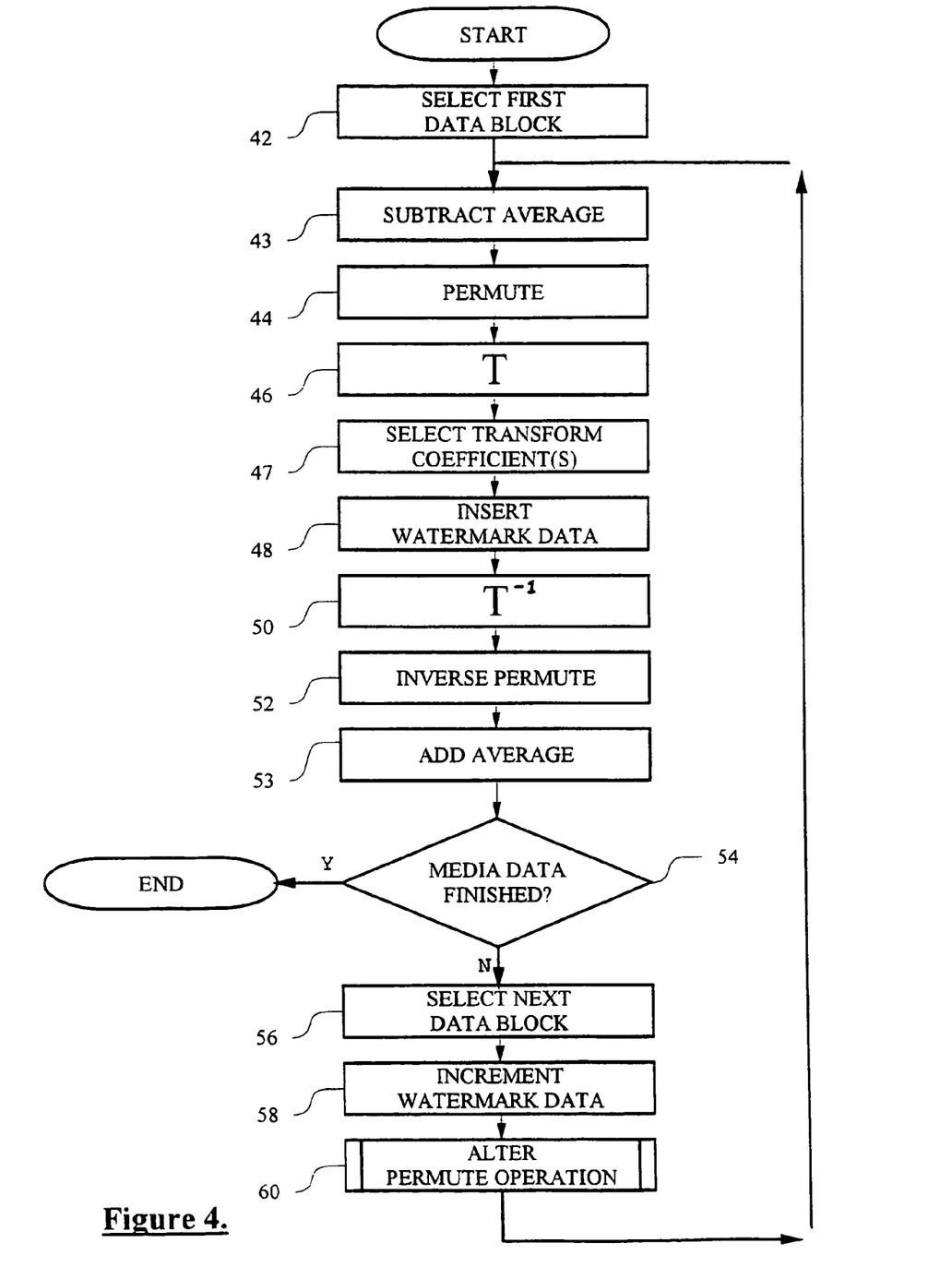
FIG. 4 is a flowchart illustrating the operations for a particular implementation of the watermarking insertion procedure.

FIG. 4 is a flow chart illustrating the insertion process of watermark data into digital media data, which has been segmented into data blocks, over a series of data blocks. Where the digital media data comprises a sequence of images, such as in the case of digital video or the like, a complete watermark (eg the total of the identification data) may in fact be distributed over more than one image or image frame. At step 42 the first data block in the image or sequence of images is selected and, if necessary, the average of that block is then calculated and subtracted from each pixel element in step 43. The resulting data block forming the image segment is subjected to a permute operation, as described hereinabove, at step 44. The permuted image data is then transformed using a block transform. At step 47 a particular transform coefficient is selected for possible modification. The selection process is performed in a pseudo random deterministic manner. Transforms that contain the block average (dc) in one transform coefficient, or set of coefficients, must eliminate this coefficient from the selection process. Step 48 performs the modification operation to incorporate the watermark data into the selected transform coefficient(s). The inverse of the transformation and permute operations are then applied at steps 50 and 52 and step 53 adds to each pixel value the average as determined in step 43, if necessary. A test is then applied at step 54 to determine whether the media data has finished, and if so the watermarking procedure ends. Otherwise, the next block of the digital media data is selected at step 56. The watermark data is then incremented, meaning the next component of the watermark data, such as the next data bit or binary pixel element, is selected at step 58. Of course, it will be recognised that it is unnecessary for every data block of a particular digital media data source to be encoded with watermark data, and only a certain selection of data blocks may in fact be encoded with watermark data in practice. To provide copyright protection for the complete image sequence, the watermark can be repeatedly inserted, with the watermark beginning at different frame locations within the sequence and ensuring that watermarks do not overlap. Of course, acquisition of the signal is important. This can be accomplished, by incorporating in the watermark data, synchronisation information that, once acquired informs the watermark reader the location of the beginning of the watermark message data or binary graphic.

To increase robustness and ensure readability even in the case where the original video signal is significantly changed, such as through reduced spatial resolution or the case where watermarked interlaced material is later converted to non-interlaced format, the watermark can be distributed across both fields in such a way that the watermark can be independently read from either or both fields and/or restricted to the low spatial frequencies. The latter may be accomplished by the application of a 2×2 WHT on each row of the image to produce low and high spatial frequency components. The watermark is then inserted in only the half horizontal resolution frame corresponding to the low spatial frequencies. The full resolution watermarked frame is produced by performing an inverse 2×2 WHT on the rows making up the low spatial frequency watermarked half horizontal resolution frame and the original high spatial frequency half horizontal resolution frame.

In order to further improve security of the watermarking procedure, it is possible to alter the permute operation periodically (step 60 in FIG. 4). As mentioned above, it is nevertheless necessary that the particular permute operation performed on each data block be repeatable at a future time to enable extraction of the watermark.

Figure 5:
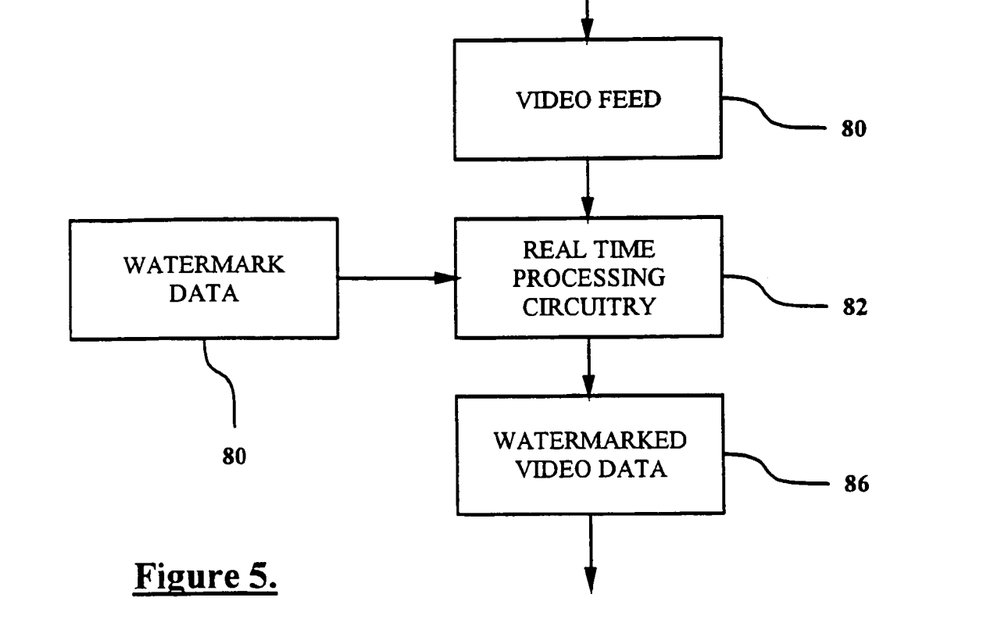
FIG. 5 is a block diagram of watermarking apparatus for real-time video.

FIG. 5 illustrates a block diagram of watermarking apparatus for encoding real time video with watermark data according to an embodiment of the present invention. Real time video feed is provided to the apparatus at a buffer 80 or the like, which provides an input to real time processing circuitry 82. The circuitry 82 may comprise digital processing circuitry in the form of high speed programmable computer circuitry, for example, which carries out the algorithmic steps described in connection with FIG. 4, for example. The watermark data is provided from a buffer 84 which may be in the form, for example, of a ring buffer which cyclically feeds watermark data being a component of watermark text or graphic material to the processing circuitry 82. The reconstructed video data containing the watermark data is then passed to an output buffer 86 which provides the video data for transmission, recording or whatever function the video data is required for.

Figure 6:
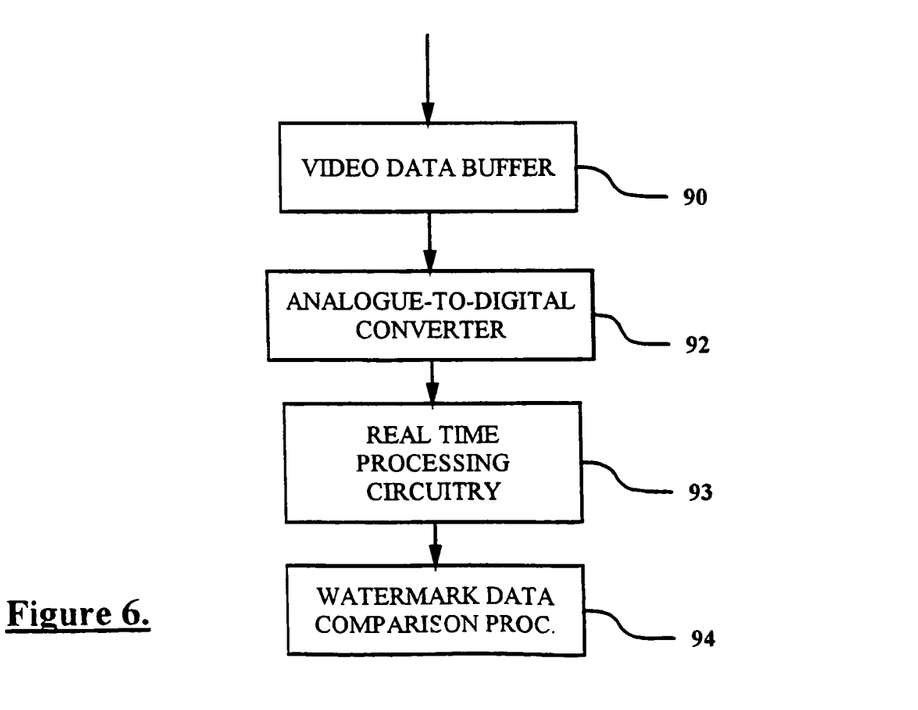
FIG. 6 is a block diagram of a media monitoring system.

Embodiments of the invention, operating in real time, can be utilised to add watermark data to media such as video and/or audio during live broadcast or other transmission, whilst recording to storage such as tape or disc, during broadcast or other transmission from storage, and during transferal from one storage device to another, for example. Furthermore, embodiments of the invention operating in real time can be used to monitor media such as television transmissions to detect the presence of watermark data incorporated in the media data. A block diagram of such a system is illustrated in FIG. 6. Video data is provided to a buffer 90 from a source such as a broadcast receiver or the like. Real time processing circuitry 93 is coupled to receive the media data from the buffer 90 and perform the algorithmic steps described in connection with FIG. 2, for example. This results in the extraction of any watermarking data contained in the media data which was inserted according to a process known to the monitoring apparatus (i.e. watermark data which has been added with a known permutation and transform in transform coefficients selected according to a known scheme). A comparison processor 94 can then be used to compare any watermark data which is retrieved with stored watermark data to determine if the retrieved watermark data corresponds to a known watermark indicating the source of the media data.

It will be appreciated from the foregoing description that the original media data is not required by the watermark extraction process in order to extract the watermark data, and therefore it is not required that the original image be certified by a trusted third party or held in escrow in order to prove the presence of a watermark in the media data. Random accessibility of a watermark within an image sequence is easily achieved, as all that is required to extract the watermark is the image or sequence of images that contains sufficient watermark data to reconstruct the entire watermark or a substantial portion thereof, and the secret keys used to seed the random permutation and the random coefficient selection process.

The watermarking process according to an embodiment of the invention has been tested on still images and image sequences, and has been demonstrated to be near invisible to the naked eye in a comparison between the reconstructed, watermarked media data and the original media data. It has also be found to be secure and robust to compression such as 4 Mbps MPEG coding of image sequences and 20% quality setting for JPEG compressed still images. The described watermarking procedure is also robust to digital-to-analogue and analogue-to-digital conversions. Accordingly, embodiments of the invention can be utilised to insert and extract watermark data in analogue media as well as digital media. For example, watermark data can be inserted and extracted from broadcast or home quality analogue or digital video. Tests have been performed demonstrating a successful read operation for watermarked digital video originally of broadcast studio quality which has been temporarily recorded on an analogue consumer VHS tape. In the case where the media is generated, stored and/or transmitted in an analogue form, an analogue-to-digital conversion using known techniques is used to obtain digital media data before inserting or extracting the watermark data (see 92 in FIG. 6). The media data may be returned to analogue form, if desired, using known digital-to-analogue techniques.

It will also be appreciated that the simple nature of the computational processes involved in the watermarking process of the present invention allow it to be applied quite readily to real time video data, for example. This is because the only two computationally complex steps in the watermarking procedure, namely the permute and transformation are still relatively simple. This makes for a watermarking process that is very low in complexity, is easily automated, and requires no human intervention in its application.

The foregoing detailed description of the present invention has been presented by way of example only, and is not intended to be considered limiting to the invention as defined in the claims appended hereto.

The invention claimed is:

1. A method for inserting identification or authentication data into digital media data, including:
   segmenting the digital media data into data blocks;
   applying a pseudo-random reversible function to a block of the digital media data to obtain a modified data block;
   applying an orthogonal transform on the modified data block to obtain transform domain data;
   modifying at least one selected transform domain data coefficient in accordance with identification or authentication data;
   inverse transforming the transform domain data having the at least one modified coefficient; and
   applying an inverse pseudo-random function to obtain watermarked digital media data.

2. A method as claimed in claim 1, wherein the pseudo-random function applied to the data block is a keyed function controlled by a cryptographic key.

3. A method as claimed in claim 1 or 2, wherein the pseudo-random function applied to the data block has a property of flattening the power spectral density of the data block.

4. A method as claimed in claim 1, wherein application of the pseudo-random function and application of the orthogonal transform are carried out in the same operation.

5. A method as claimed in claim 1, wherein the at least one transform domain data coefficient selected for modification is selected according to a keyed pseudo-random operation.

6. A method as claimed in claim 1, wherein a plurality of data blocks of the digital media data are modified according to the identification or authentication data.

7. A method as claimed in any one of claims 1 to 6, wherein the digital media data is video data.

8. A method as claimed in any one of claims 1 to 6, wherein the digital media data is audio data.

9. A method as claimed in claim 7 or 8, wherein the identification or authentication data is inserted into the digital media data in real time.

10. A method as claimed in claim 1, wherein at least one coefficient in the transform domain data which represents the average (dc) of the data block is restricted from selection for modification with the identification or authentication data.

11. A method as claimed in claim 1 or 10, wherein the orthogonal transform is a Walsh Hadamard transform.

12. A method as claimed in claim 1 or 10, wherein the orthogonal transform is selected from a discrete cosine transform, a discrete sine transform and a fast Fourier transform.

13. A method as claimed in claim 1, wherein the pseudo-random reversible function is a permutation of the data block based on a keyed pseudo-random number generator.

14. A method as claimed in claim 1, including determining an average of data values in the data block, subtracting the average value from the data values in the data block before applying the pseudo-random function, and adding the average value back to the data values in the data block after applying the inverse pseudo-random function.

15. A method for extracting identification or authentication data from watermarked digital media data, including:
   segmenting the digital media data into data blocks;
   applying a pseudo-random reversible function to a block of the digital media data to obtain a modified data block;
   applying an orthogonal transform to the modified data block to obtain transform domain data; and
   extracting identification or authentication data from at least one coefficient of the transform domain data.

16. A method as claimed in claim 15, wherein the pseudo-random function applied to the data block is a keyed function controlled by a cryptographic key.

17. A method as claimed in claim 15 or 16, wherein the pseudo-random function applied to the data block has a property of flattening the power spectral density of the data block.

18. A method as claimed in claim 15, wherein application of the pseudo-random function and application of the orthogonal transform as carried out in the same operation.

19. A method as claimed in claim 15, wherein the act of extracting includes selecting at least one transform domain data coefficient from which to extract identification or authentication data according to a keyed pseudo-random operation.

20. A method as claimed in any one of claims 15 to 19, wherein the digital media data comprises video data.

21. A method as claimed in any one of claims 15 to 19, wherein the digital media data comprises audio data.

22. A method as claimed in claim 20 or 21, wherein the identification or authentication data is extracted from the digital media data in real time.

23. A method as claimed in claim 15, wherein the orthogonal transform is a Walsh Hadamard transform.

24. A method as claimed in claim 15, wherein the orthogonal transform is selected from a discrete cosine transform, a discrete sine transform and a fast Fourier transform.

25. A method as claimed in claim 15, wherein the pseudo-random reversible function is a permutation of the data block based on a keyed pseudo-random number generator.

26. A method as claimed in claim 15, including determining an average of data values in the data block, and subtracting the average value from the data values in the data block before applying the pseudo-random function.

27. An apparatus for inserting or extracting watermark data in digital media data, comprising:
   segmenting means for segmenting the digital media data into data blocks;
   processing means for applying a pseudo-random reversible function to a block of the digital media data to obtain a modified data block and performing a transform on the modified data block to obtain transform domain data; and
   means for inserting or extracting watermark data in at least one coefficient of the transform domain data.

28. An apparatus as claimed in claim 27, wherein the processing means is also adapted to apply an inverse transformation and inverse pseudo-random function of the transform domain data containing the watermark data so as to generate watermarked digital media data.

29. An apparatus as claimed in claim 27 or 28, wherein the apparatus inserts or extracts watermark data in digital media data in real time.

30. An apparatus as claimed in claim 29, wherein the digital media data comprises video data.

31. An apparatus as claimed in claim 29, wherein the digital media data comprises audio data.

32. An apparatus as claimed in claim 27, including means for selecting at least one transform domain data coefficient for the insertion or extraction of identification or authentication data according to a keyed pseudo-random operation.

33. A media data monitoring system comprising:
   a media data buffer for temporarily storing media data received from a data source;
   a real time processor coupled to receive media data from the media data buffer and adapted to extract identification or authentication data according to the method defined in claim 15; and
   a comparison processor coupled to the real time processor for comparing extracted identification or authentication data with known identification or authentication data.

34. A media monitoring system as claimed in claim 33, including an analogue-to-digital converter for converting media data into a digital form before processing by the real time processor.

35. A media monitoring system as claimed in claim 33 or 34, wherein the media data comprises video data.

36. A media monitoring system as claimed in claim 35, wherein the data source of the media data is a receiver of video transmissions.

37. A media data monitoring method comprising:
   receiving media data from a data source;
   extracting identification or authentication data according to the method defined in claim 15; and comparing extracted identification or authentication data with known identification or authentication data.

38. A media monitoring method as claimed in claim 37, including converting the media data into a digital form before processing by the real time processor.

39. A media monitoring method as claimed in claim 37 or 38, wherein the media data comprises video data.

40. A media monitoring method as claimed in claim 39, wherein the media data is received from a video transmission.

41. In a method of steganographically encoding content data to encode a digital watermark therein, the content data representing audio or visual information and comprising plural samples, each having a value, the digital watermark representing a plural-bit payload, the method including segmenting the content data into portions and processing same to encode the digital watermark therein, an improvement comprising subtracting from each of the samples in said portion a non-zero value, the same value being subtracted from each of the samples in said portion.

42. The method of claim 41 in which the method further includes determining an average value of samples within a portion, and subtracting said average value from each of the samples included in said portion.

43. The method of claim 41 in which the samples in each portion have an order, and the method includes scrambling said order as part of said processing.

44. In a method of steganographically encoding content data to encode a digital watermark therein, the content data representing audio or visual information and comprising plural samples, each having a value, the digital watermark representing a plural-bit payload, the method including segmenting the content data into portions and processing same to encode the digital watermark therein, an improvement wherein the samples in each portion have an order, and the method includes scrambling said order as part of said processing.

45. The method of claim 44 that includes scrambling the order of a first portion in a first manner, and scrambling the order of a second portion in a second, different, manner.

46. The method of claim 44 that includes scrambling said order, and thereafter transforming the scrambled data into an orthogonal domain, and thereafter changing the transformed data in accordance with the watermark payload.

47. In a method of steganographically decoding content data to decode a digital watermark therefrom, the content data representing audio or visual information and comprising plural samples, each having a value, the digital watermark representing a plural-bit payload, the method including segmenting the content data into portions and processing same to decode the digital watermark therefrom, an improvement wherein the decoding proceeds without reference to an unencoded original of said content data, and the method includes subtracting from each of the samples in said portion a non-zero value, the same value being subtracted from each of the samples in said portion.

48. The method of claim 47 in which the method further includes determining an average value of samples within a portion, and subtracting said average value from each of the samples included in said portion.

49. A method of encoding image or video content with a digital watermark comprising:
providing data corresponding to a logo graphic;
providing content data, the content data representing image or video information and comprising plural samples, each having a value;
segmenting the content data into blocks;
transforming the segmented content data into another domain;
processing the transformed content data in accordance with the data corresponding to the logo graphic; and
inverse-transforming the processed content data back into an original domain.

50. In a method of steganographically encoding content data to encode a digital watermark therein, the digital watermark representing a plural bit payload, the content data representing audio or visual information when rendered in a time, or spatial domain, respectively, the method processing said content data in a domain orthogonal to said time or spatial domain, said content data being represented in said orthogonal domain by an array of coefficients, each having a value, an improvement wherein each bit of the watermark payload is associated with at least one of the coefficients, and the method includes assessing a coefficient to determine whether it has an original value consistent with a bit of the watermark payload associated therewith and, if not, then changing the coefficient value, and else leaving the coefficient value unchanged.

51. The method of claim 50 in which a bit of the watermark payload is represented by a sign of a coefficient associated therewith, and the method includes changing the value of the coefficient only if its sign is not in accordance with a value of said watermark payload bit.

52. The method of claim 50 wherein said processing includes increasing the values of certain of said content data coefficients, based on bits of the digital watermark payload.

* * * * *